United States Patent
Giri et al.

(10) Patent No.: US 8,478,940 B2
(45) Date of Patent: Jul. 2, 2013

(54) CONTROLLING SIMULATION OF A MICROPROCESSOR INSTRUCTION FETCH UNIT THROUGH MANIPULATION OF INSTRUCTION ADDRESSES

(75) Inventors: Akash V. Giri, Austin, TX (US); Darin M. Greene, Austin, TX (US); Alan G. Singletary, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 12/476,477

(22) Filed: Jun. 2, 2009

(65) Prior Publication Data

US 2010/0306476 A1 Dec. 2, 2010

(51) Int. Cl.
*G06F 12/00* (2006.01)
*G06F 13/00* (2006.01)

(52) U.S. Cl.
USPC ........... 711/118; 711/100; 711/150; 711/151; 711/213; 711/E12.001; 711/E12.057; 703/17; 703/22; 714/33; 714/739

(58) Field of Classification Search
USPC ................. 711/100, 118, 150, 151, 154, 213, 711/E12.001, E12.057; 703/22, 17; 714/33, 714/739
See application file for complete search history.

(56) References Cited

U.S. PATENT DOCUMENTS

| 5,475,852 | A | * | 12/1995 | Yoshida et al. | 714/34 |
| 6,212,493 | B1 | | 4/2001 | Huggins et al. | |
| 6,249,892 | B1 | * | 6/2001 | Rajsuman et al. | 714/741 |
| 2005/0038976 | A1 | * | 2/2005 | Miller | 712/207 |

* cited by examiner

*Primary Examiner* — Midys Rojas
(74) *Attorney, Agent, or Firm* — Matthew B. Talpis; Jack V. Musgrove

(57) ABSTRACT

Instruction fetch unit (IFU) verification is improved by dynamically monitoring the current state of the IFU model and detecting any predetermined states of interest. The instruction address sequence is automatically modified to force a selected address to be fetched next by the IFU model. The instruction address sequence may be modified by inserting one or more new instruction addresses, or by jumping to a non-sequential address in the instruction address sequence. In exemplary implementations, the selected address is a corresponding address for an existing instruction already loaded in the IFU cache, or differs only in a specific field from such an address. The instruction address control is preferably accomplished without violating any rules of the processor architecture by sending a flush signal to the IFU model and overwriting an address register corresponding to a next address to be fetched.

10 Claims, 4 Drawing Sheets

CONTROLLING SIMULATION OF A MICROPROCESSOR INSTRUCTION FETCH UNIT THROUGH MANIPULATION OF INSTRUCTION ADDRESSES

STATEMENT REGARDING FEDERALLY SPONSORED RESEARCH OR DEVELOPMENT

This invention was made with United States Government support under Agreement No. HR0011-07-9-0002 awarded by DARPA. THE GOVERNMENT HAS CERTAIN RIGHTS IN THIS INVENTION.

BACKGROUND OF THE INVENTION

1. Field of the Invention

The present invention generally relates to computer systems, and more specifically to a method of simulating microprocessor operation for verification purposes, particularly operation of the instruction fetch unit within a microprocessor.

2. Description of the Related Art

Microprocessors are used for a wide variety of electronics applications. High-performance computer systems typically use multiple microprocessors to carry out the various program instructions embodied in computer programs such as software applications and operating systems. A conventional microprocessor design is illustrated in FIG. 1. Processor 10 is generally a single integrated circuit superscalar microprocessor, and includes various execution units, registers, buffers, memories, and other functional units which are all formed by integrated circuitry. Processor 10 operates according to reduced instruction set computing (RISC) techniques, and is coupled to a system or fabric bus 12 via a bus interface unit (BIU) 14 within processor 10. BIU 14 controls the transfer of information between processor 10 and other devices coupled to system bus 12, such as a main memory or a second-level (L2) cache memory, by participating in bus arbitration. Processor 10, system bus 12, and the other devices coupled to system bus 12 together form a host data processing system.

BIU 14 is connected to an instruction cache 16 and to a data cache 18 within processor 10. High-speed caches, such as those within instruction cache 16 and data cache 18, enable processor 40 to achieve relatively fast access time to a subset of data or instructions previously transferred from main memory to the caches, thus improving the speed of operation of the host data processing system. Instruction cache 16 is further coupled to a fetcher 20 which fetches instructions for execution from instruction cache 16 during each cycle. Fetcher 20 temporarily stores sequential instructions within an instruction queue 21 for execution by other execution circuitry within processor 10. From the instruction queue 21, instructions pass sequentially through the decode unit 22 where they are translated into simpler operational codes (iops) and numerous control signals used by the downstream units. After being decoded, instructions are processed by the dispatch unit 23, which gathers them into groups suitable for simultaneous processing and dispatches them to the issue unit 42. Instruction cache 16, fetcher 20, instruction queue 21, decode unit 22 and dispatch unit 23 are collectively referred to as an instruction fetch unit 24.

The execution circuitry of processor 10 has multiple execution units for executing sequential instructions, including one or more fixed-point units (FXUs) 26, load-store units (LSUs) 28, floating-point units (FPUs) 30, and branch processing units (BPUs) 32. These execution units 26, 28, 30, and 32 execute one or more instructions of a particular type of sequential instructions during each processor cycle. For example, FXU 26 performs fixed-point mathematical and logical operations such as addition, subtraction, shifts, rotates, and XORing, utilizing source operands received from specified general purpose registers (GPRs) or GPR rename buffers. Following the execution of a fixed-point instruction, FXUs 26 output the data results of the instruction to the GPR rename buffers, which provide temporary storage for the operand data until the instruction is completed by transferring the result data from the GPR rename buffers to one or more of the GPRs. FPUs 30 perform single and double-precision floating-point arithmetic and logical operations, such as floating-point multiplication and division, on source operands received from floating-point registers (FPRs) or FPR rename buffers. FPU 30 outputs data resulting from the execution of floating-point instructions to selected FPR rename buffers, which temporarily store the result data until the instructions are completed by transferring the result data from the FPR rename buffers to selected FPRs. LSUs 28 execute floating-point and fixed-point instructions which either load data from memory (i.e., either the data cache within data cache 18 or main memory) into selected GPRs or FPRs, or which store data from a selected one of the GPRs, GPR rename buffers, FPRs, or FPR rename buffers to system memory. BPUs 32 perform condition code manipulation instructions and branch instructions.

Processor 10 employs both pipelining and out-of-order execution of instructions to further improve the performance of its superscalar architecture, but may alternatively use in-order program execution. For out-of-order processing, instructions can be executed by FXUs 26, LSUs 28, FPUs 30, and BPUs 32 in any order as long as data dependencies are observed. In addition, instructions are processed by each of the FXUs 26, LSUs 28, FPUs 30, and BPUs 32 at a sequence of pipeline stages, in particular, five distinct pipeline stages: fetch, decode/dispatch, execute, finish, and completion.

During the fetch stage, fetcher 20 retrieves one or more instructions associated with one or more memory addresses from instruction cache. Sequential instructions fetched from instruction cache 16 are stored by fetcher 20 within instruction queue 21. The instructions are processed by the decode unit 22 and formed into groups by the dispatch unit 23. Issue unit 42 then issues one or more instructions to execution units 26, 28, 30, and 32. Upon dispatch, instructions are also stored within the multiple-slot completion buffer of a completion unit 44 to await completion. Processor 10 tracks the program order of the dispatched instructions during out-of-order execution utilizing unique instruction identifiers.

It can be seen from the foregoing description that the flow of instructions through a state-of-the-art microprocessor is particularly complicated, and timing is critical. It is accordingly incumbent upon the designer to be able to verify proper operation of a new microprocessor design, especially the instruction fetch unit (IFU) 24. Functional verification of IFUs is conventionally accomplished by running computer simulations in which program instructions are fetched from other devices outside of the simulated processor, or from the internal caches within the IFU model, and delivered to the other portions of the simulated processor for execution. The instructions fetched may be part of a special software program written for testing purposes, or may be generated by the verification environment; see, e.g., U.S. Pat. No. 6,212,493.

With specific regard to functional verification of the IFU, there is a different focus compared to the other components of the processor. For significant portions of the IFU, the actual instructions being processed are irrelevant or at most secondary. They are merely pieces of binary data which need to be delivered to the rest of the CPU as requested. Much more important than the instructions themselves are the addresses by which they are retrieved and processed. The instruction addresses control which instructions are fetched, where they are stored in any resident caches, and whether duplications or conflicts exist between different execution threads or storage locations.

Unfortunately, the prior art lacks an effective method of precisely controlling the addresses to be handled by the IFU at any given point in the simulation. Randomly generated instruction address sequences do not allow for the creation of specific simulation scenarios which may be of interest to the designer. The '493 patent provides some improvement by collecting profile data such as addresses and program counter contents, but this approach still requires multiple passes of the simulation. It would, therefore, be desirable to devise an improved method for simulation of an instruction fetch unit which could allow dynamic control of the instruction addresses as the simulation progresses. It would be further advantageous if the method could force a specially selected instruction address to be fetched during the next IFU cycle.

SUMMARY OF THE INVENTION

It is therefore one object of the present invention to provide an improved method of verifying proper operation of an instruction fetch unit design.

It is another object of the present invention to provide such a method which more effectively tests the handling of instruction addresses by the IFU design under certain operational conditions of interest.

It is yet another object of the present invention to provide an IFU verification environment which can dynamically force fetches of specified addresses as a simulation progresses.

The foregoing objects are achieved in a method of testing a design for an IFU by supplying a sequence of instruction addresses to an IFU model which represents the IFU design, fetching one or more of the program instructions according to the instruction address sequence from a memory hierarchy external to the IFU model, detecting that the current state of the IFU model is a predetermined state of interest, and automatically modifying the instruction address sequence to force a selected address to be fetched next by the IFU model. The instruction address sequence may be modified by inserting one or more new instruction addresses, or by jumping to a non-sequential address in the instruction address sequence. In exemplary implementations, the selected address is a corresponding address for an existing instruction already loaded in the IFU cache, an instruction already requested from the external memory hierarchy and in the process of being delivered to the IFU model, or differs only in a specific field from such an address. The instruction address control is preferably accomplished without violating any rules of the processor architecture by sending a flush signal to the IFU model and overwriting an address register corresponding to a next address to be fetched.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
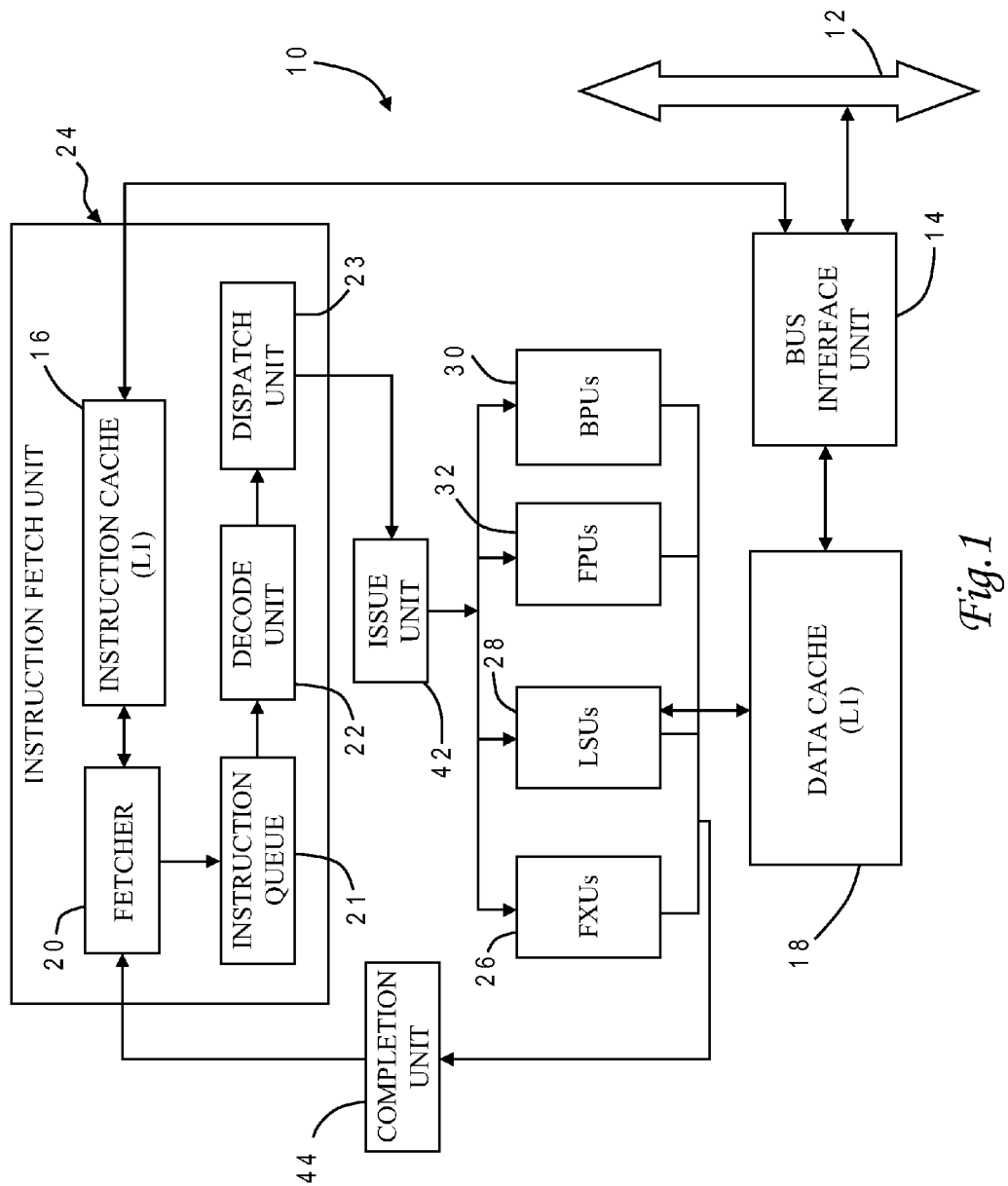
FIG. 1 is a block diagram illustrating a conventional construction for a microprocessor which includes an instruction fetch unit.
Figure 2:
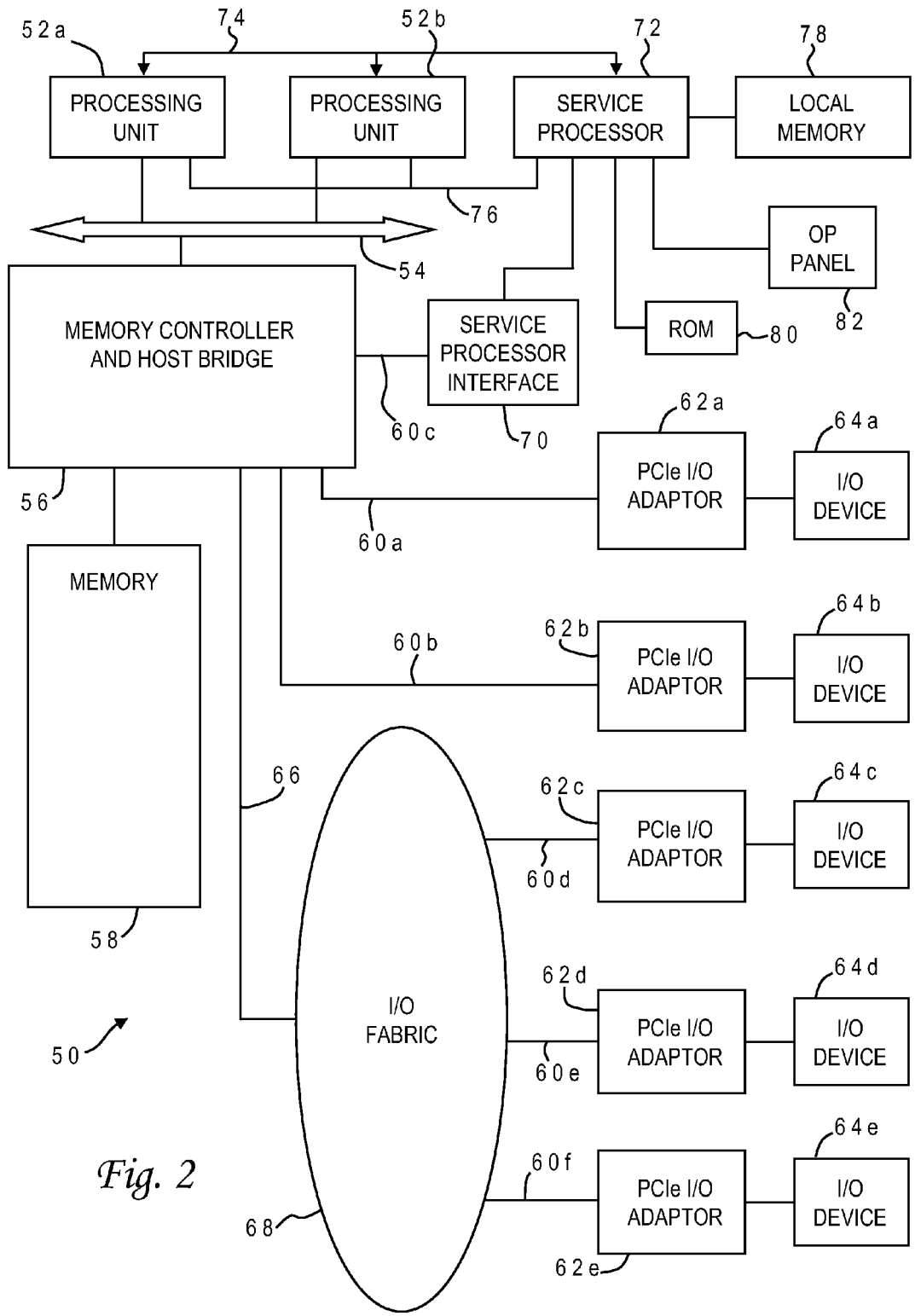
FIG. 2 is a block diagram of a computer system programmed to carry out verification of an instruction fetch unit design in accordance with one implementation of the present invention.

With reference now to the figures, and in particular with reference to FIG. 2, there is depicted one embodiment 50 of a computer system in which the present invention may be implemented to carry out verification of an instruction fetch unit design. Computer system 50 is a symmetric multiprocessor (SMP) system having a plurality of processors 52a, 52b connected to a system bus 54. System bus 54 is further connected to a combined memory controller/host bridge (MC/HB) 56 which provides an interface to system memory 58. System memory 58 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 56 also has an interface to peripheral component interconnect (PCI) Express links 60a, 60b, 60c. Each PCI Express (PCIe)link 60a, 60b is connected to a respective PCIe adaptor 62a, 62b, and each PCIe adaptor 62a, 62b is connected to a respective input/output (I/O) device 64a, 64b. MC/HB 56 may additionally have an interface to an I/O bus 66 which is connected to a switch (I/O fabric) 68. Switch 68 provides a fan-out for the I/O bus to a plurality of PCI links 60d, 60e, 60f. These PCI links are connected to more PCIe adaptors 62c, 62d, 62e which in turn support more I/O devices 64c, 64d, 64e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 56 provides a low latency path through which processors 52a, 52b may access PCI devices mapped anywhere within bus memory or I/O address spaces. MC/HB 56 further provides a high bandwidth path to allow the PCI devices to access memory 58. Switch 68 may provide peer-to-peer communications between different endpoints and this data traffic does not need to be forwarded to MC/HB 56 if it does not involve cache-coherent memory transfers. Switch 68 is shown as a separate logical component but it could be integrated into MC/HB 56.

In this embodiment, PCI link 60c connects MC/HB 56 to a service processor interface 70 to allow communications between I/O device 64a and a service processor 72. Service processor 72 is connected to processors 52a, 52b via a JTAG interface 74, and uses an attention line 76 which interrupts the operation of processors 52a, 52b. Service processor 72 may have its own local memory 78, and is connected to read-only memory (ROM) 80 which stores various program instructions for system startup. Service processor 72 may also have access to a hardware operator panel 82 to provide system status and diagnostic information.

In alternative embodiments computer system 50 may include modifications of these hardware components or their interconnections, or additional components, so the depicted example should not be construed as implying any architectural limitations with respect to the present invention.

When computer system 50 is initially powered up, service processor 72 uses JTAG interface 74 to interrogate the system (host) processors 52a, 52b and MC/HB 56. After completing the interrogation, service processor 72 acquires an inventory and topology for computer system 50. Service processor 72 then executes various tests such as built-in-self-tests (BISTs), basic assurance tests (BATs), and memory tests on the components of computer system 50. Any error information for failures detected during the testing is reported by service processor 72 to operator panel 82. If a valid configuration of system resources is still possible after taking out any components found to be faulty during the testing then computer system 50 is allowed to proceed. Executable code is loaded into memory 58 and service processor 72 releases host processors 52a, 52b for execution of the program code, e.g., an operating system (OS) which is used to launch applications and in particular the IFU verification application of the present invention, results of which may be stored in a hard disk drive of the system (an I/O device 64). While host processors 52a, 52b are executing program code, service processor 72 may enter a mode of monitoring and reporting any operating parameters or errors, such as the cooling fan speed and operation, thermal sensors, power supply regulators, and recoverable and non-recoverable errors reported by any of processors 52a, 52b, memory 58, and MC/HB 56. Service processor 72 may take further action based on the type of errors or defined thresholds.

While the illustrative implementation provides program instructions embodying the present invention on disk drive 76, those skilled in the art will appreciate that the invention can be embodied in a program product utilizing other computer-readable media. The program instructions may be written in the C++ programming language for an AIX environment. Computer system 50 carries out program instructions for a verification process that uses dynamic controls to manage instruction addresses fetched by an IFU design. Accordingly, a program embodying the invention may include conventional aspects of various simulation tools, and these details will become apparent to those skilled in the art upon reference to this disclosure.

Figure 3:
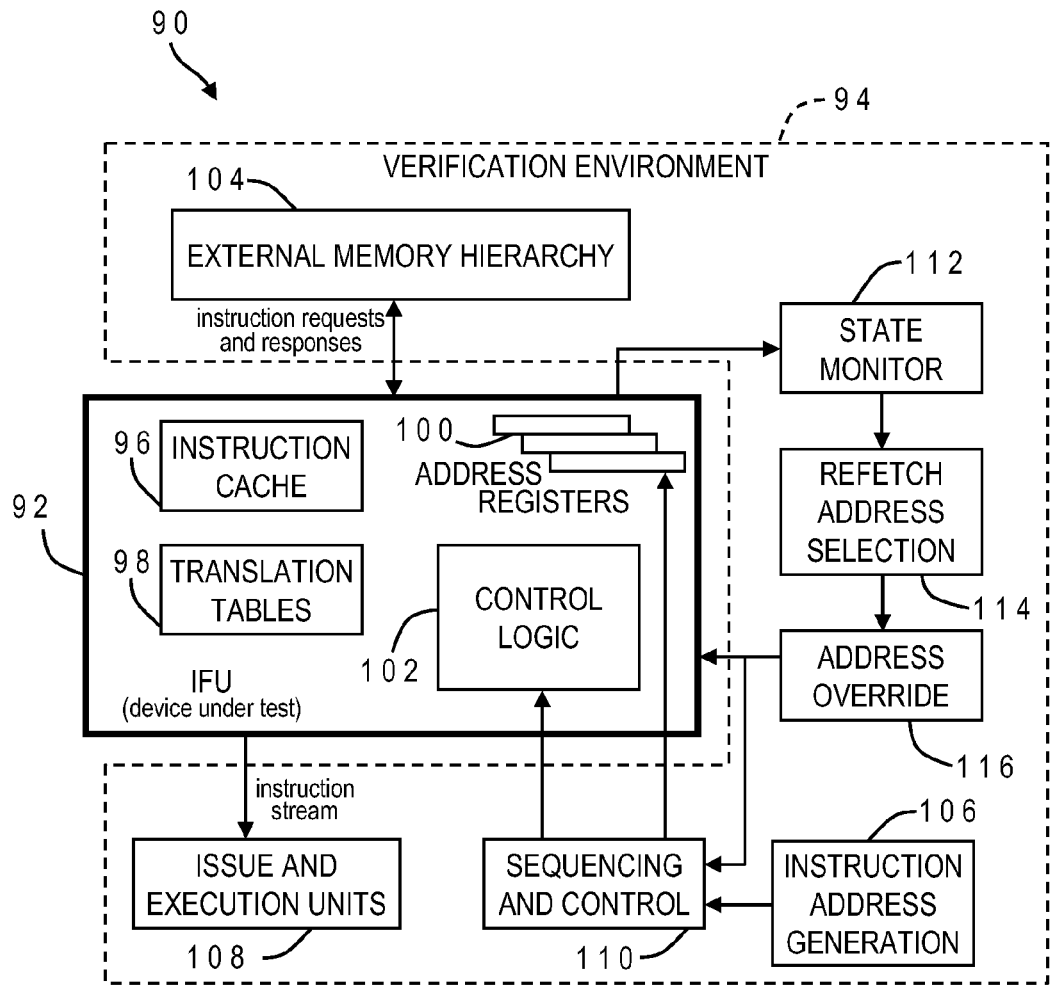
FIG. 3 is a block diagram of a simulation program having various software modules for dynamically testing an instruction fetch unit design in accordance with one implementation of the present invention.

One example of a software program embodying the present invention is illustrated in FIG. 3. Simulation program 90 is comprised of an IFU model 92 and a verification environment 94 having various software modules which mimic the behavior of devices and components interacting with the IFU. IFU model 92 represents the device to be tested, i.e., a proposed instruction fetch unit design for a microprocessor, and in this example includes an instruction cache 96, an address translation table 98, pipelined address registers 100, and control logic 102. Each of these modules within IFU model 92 is programmed to perform certain functions on a cycle-by-cycle basis according to the specifications of the IFU design under test, e.g., reading or writing instructions or instruction addresses, table lookups, accessing status registers, generating coherency or state bits, etc. Details of these functions go beyond the scope of the present invention and are dictated by the desired test parameters, but will become apparent to those skilled in the art upon reference to this disclosure.

Verification environment 94 includes an external memory hierarchy 104, instruction address generation 106, issue and execution units 108, and sequencing and control 110. External memory hierarchy 104 simulates the entire memory structure outside of the microprocessor, e.g., any second level (L2) or higher caches and system memory. External memory hierarchy 104 responds to address requests from IFU 92 by transmitting binary instructions associated with the requested addresses. Issue and execution units 108 receive an instruction stream dispatched by IFU model 92. Sequencing and control 110 provides IFU model 92 with addresses, state information and control signals directing when and how it should fetch additional instructions. In this embodiment the instruction addresses are initially provided by instruction address generation 106 which may use any convenient method for generating an address sequence, including random generation or sequences adapted to stress targeted functions of IFU model 92, generated either in advance of the simulation or dynamically as requested by IFU model 92.

Verification environment 94 is augmented with additional capabilities in order to precisely control the address seen by IFU model 92 for the next instruction required by the execution units. Control of this address allows control of the operations performed by the IFU model to access its internal components, and to request instructions on its external interfaces. By opportunistic manipulation of the fetch addresses, complex and interesting scenarios are created within the operational logic of the IFU model which might never otherwise occur with random or iterative simulation. These capabilities are achieved in this implementation using state monitor 112, address selector 114, and address override 116. State monitor 112 reads the current state of IFU model 92 and detects any interesting conditions as predefined by the programmer. The current state of IFU model 92 may for example be based upon characteristics of the internal components such as the instruction cache 96 and address translation table 98, and characteristics of the interface between IFU model 92 and external memory hierarchy 104 such as a recent history of requests and responses.

As an example, when a group of instructions is being sent from external memory hierarchy 104 back to IFU model 92 in response to a fetch request, said group will typically pass sequentially through a pipeline containing a number of different stages. At each stage, operations may be performed on the group of instructions, or actions may be driven within the IFU model, based on the contents or characteristics of the group of instructions. For the purpose of complete verification of the proper performance of the fetch logic, it is desirable to induce collisions between an incoming group of instructions at each of the different stages in the pipeline and a new outgoing request from the fetch logic. One interesting collision scenario would be a request for an instruction that is within the incoming group, but different in address from the instruction originally requested. Another case would involve a colliding request to an address that differs from that originally requested, but which falls into the same congruence class, meaning that certain fields of the address are common and would cause the instructions to map to the same location in the instruction cache 16. These actions may be taken when state monitor 112 detects various states of interest such as an error (from IFU model 92 or from an external module such as an L2 cache), receipt of a particular sector of a multi-instruction cache line which includes the requested instruction, or certain asynchronous events such as a cache line for a requested instruction being invalidated prior to delivery of the critical sector.

Once a predetermined state of interest has been detected, address selector 114 is automatically invoked to generate a new fetch address required to induce the desired test conditions within IFU model 92. Address selector 114 may for example cause IFU model 92 to fetch a cache line for which a request is already outstanding for another thread, or fetch an address which is similar to one currently resident in the cache, but different in a specific field or fields of the local or translated address. Such refetches are preferably accomplished by overriding the state of the IFU under test without violating any rules of the processor architecture. One implementation of such a refetch is to send to the IFU a flush signal of the type that causes execution to resume at the next instruction address, while overwriting the register containing this address with the selected address address of interest. These functions may be carried out by an address override 116 programmed to manipulate the appropriate components of IFU model 92 and sequencing and control 110.

One such modification would be to override a fetch to the next sequential set of addresses with a different set which targets the same location in the instruction cache 16 as the previous request. It is common to use a subset of each instruction address to determine a congruence class which determines which line in an instruction cache will store the instruction group. For example, any arbitrary 5 bits of a 64-bit address might be used to map an instruction address into one of the 32 lines of an instruction cache. If a goal of the verification process is to operate the cache in a full or overfull condition, then new addresses of the same congruence class might be continually inserted, rather than allowing for sequential fetching to occur.

While it is interesting to have collisions between new fetches and addresses already loaded in the cache, it is also useful to examine collisions between new fetches and requests that were outstanding or in the process of being returned from the L2 cache and delivered to the IFU model. In an exemplary implementation, a single request from the fetcher to the L2 cache results in a cache line being returned. However, a single cache line holds 32 instructions which come back as 4 sectors of 8 instructions each, asynchronously and in any order, so there is interest in a new request that would hit in a line that is partially returned (maybe some sectors in the cache, maybe none yet). The sectors may go through a pipeline of about 6 cycles from the time that the fetcher logic becomes aware of them until they are safely written into the instruction cache. It is of interest to see collisions at each of these steps.

Figure 4:
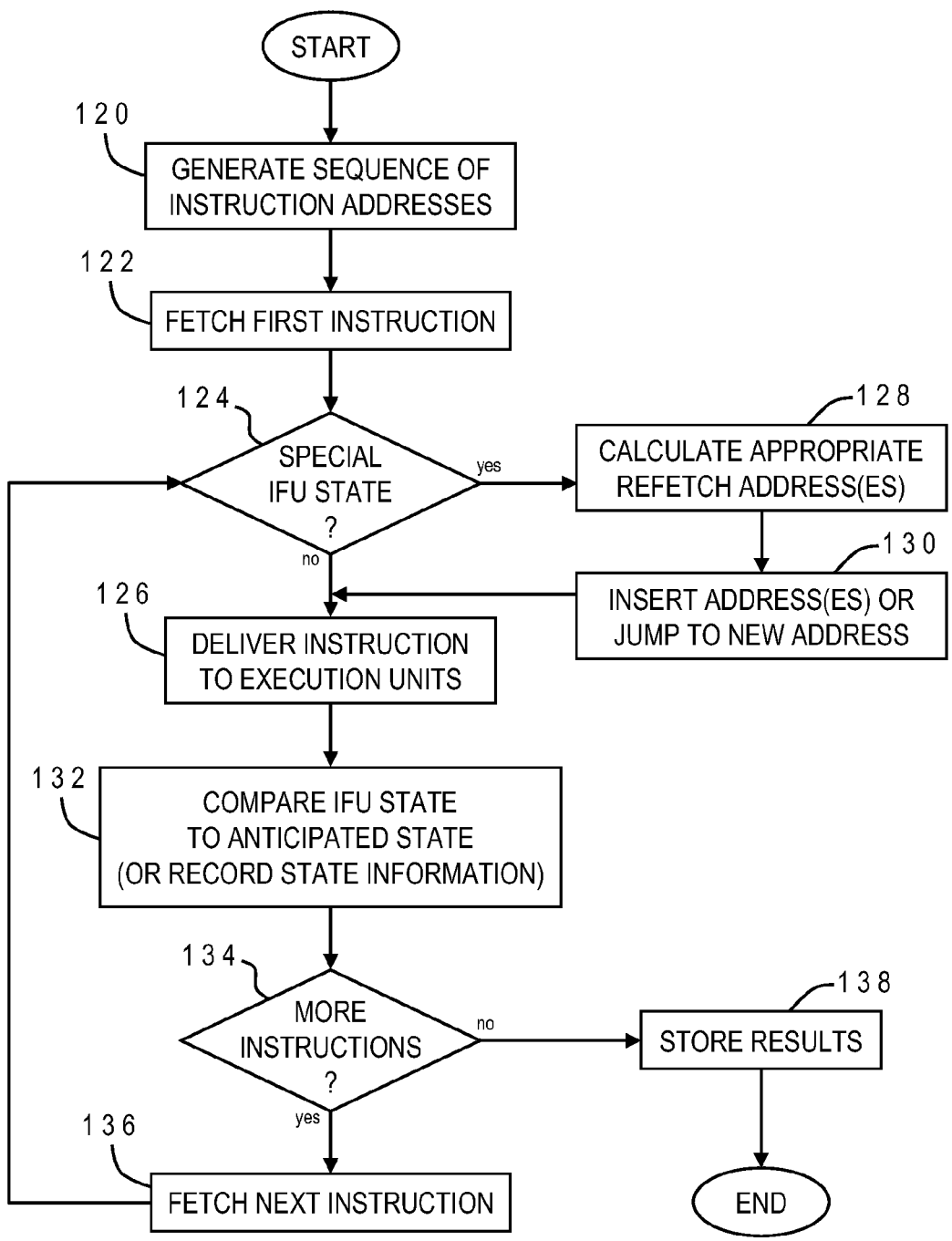
FIG. 4 is a chart illustrating the logical flow for controlling the simulation of an instruction fetch unit design by manipulating instruction addresses in accordance with one implementation of the present invention.

The invention may be further understood with reference to the flow chart of FIG. 4 which illustrates an IFU verification process in accordance with one implementation. The process progresses as a time clock for the system (IFU and verification environment) advances cycle-by-cycle, and begins by generating instruction addresses to be sequentially fetched by the IFU and delivered to the execution units (120). The IFU then fetches the first address in the sequence from the external memory hierarchy (122). The state monitor examines the current state of the IFU after the first address fetch to check for any special states of interest (124). If the current state is not a special state, the process proceeds with the IFU delivering the instruction to the execution units (126). However, if a special state is detected, one or more appropriate refetch addresses are calculated (128), and the new addresses are inserted into the address registers of the IFU with appropriate sequencing control signals (130). As an alternative to inserting new addresses, the process may instead jump (in a non-sequential manner) to an address in the original list of addresses from instruction address generation 106, by moving an address pointer of sequencing and control 110 (either ahead or behind). After this dynamic modification of the address sequence, the process continues with instruction delivery (126). The state of the IFU is then examined for verification purposes, i.e., compared to an anticipated state or recorded for later comparison (132). Verification may examine various aspects of the IFU, including for example timing of write operations, control signals and interface, the instruction itself within the cache, pre-decode information, parity bits, partial directory addresses, coherency bits, state machine registers (for instruction relocation or remapping), thread indicator bits, hypervisor permission levels, etc. If there are more instructions remaining in the test sequence (134) the next instruction in the sequence is fetched (136), which will be a new refetch address if the current state of the IFU is a predetermined state of interest. The process thereafter returns to monitoring the IFU state (124). Once all addresses in the sequence have been fetched, the verification results are stored for later review by the designer (138).

The present invention accordingly provides a much more effective method for testing operation of an IFU, with the ability to dynamically force fetches of specified addresses as a simulation progresses. This feature of the invention allows the designer to tailor IFU testing for special states of interest which might otherwise never be simulated.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer-implemented method of testing a design for an instruction fetch unit (IFU) of a microprocessor, comprising:
supplying a sequence of instruction addresses to an IFU model which represents the IFU design, wherein the instruction addresses correspond to program instructions provided by a memory hierarchy which is external to the IFU model;
fetching one or more of the program instructions according to the instruction address sequence from the external memory hierarchy to the IFU model;
detecting that a current state of the IFU model is a predetermined state of interest;
automatically modifying the instruction address sequence responsive to said detecting to force a selected address to be fetched next by the IFU model, wherein the selected address is specifically based on the predetermined state of interest; and
fetching a program instruction corresponding to the selected address from the external memory hierarchy to the IFU model.

2. The method of claim 1 wherein the instruction address sequence is modified by inserting at least one new instruction address.

3. The method of claim 1 wherein the instruction address sequence is modified by jumping to a non-sequential address in the instruction address sequence.

4. The method of claim 1 wherein the selected address is a corresponding address for an instruction already requested from the external memory hierarchy and in the process of being delivered to the IFU model.

5. The method of claim 1 wherein the selected address differs only in a specific field from a corresponding address for an existing instruction already loaded in a cache of the IFU model.

6. The method of claim 1 wherein:
the IFU model includes a plurality of address registers which are pipelined such that a first one of the address registers is designated to provide a next address to be fetched; and
said modifying is accomplished without violating any rules of the microprocessor architecture by sending a flush signal to the IFU model and overwriting the first address register with the selected address.

7. The method of claim 1 wherein the predetermined state of interest is an error condition.

8. The method of claim 1 wherein the predetermined state of interest is receipt of a particular sector of a multi-instruction cache line which includes a requested instruction.

9. The method of claim 1 wherein the predetermined state of interest is a cache line for a requested instruction being invalidated prior to delivery of a corresponding sector of the cache line.

10. A computer-implemented method of testing a design for an instruction fetch unit (IFU) of a microprocessor, comprising:

supplying a sequence of instruction addresses to an IFU model which represents the IFU design, wherein the instruction addresses correspond to program instructions provided by a memory hierarchy which is external to the IFU model, and the IFU model includes an instruction cache and a plurality of address registers which are pipelined such that a first one of the address registers is designated to provide a next address to be fetched;

fetching one or more of the program instructions according to the instruction address sequence from the external memory hierarchy to the IFU model;

detecting that a current state of the IFU model includes an outstanding fetch request for a cache line which is in the process of being delivered to the instruction cache;

automatically modifying the instruction address sequence responsive to said detecting without violating any rules of the microprocessor architecture by sending a flush signal to the IFU model and overwriting the first address register with a selected address, wherein the selected address is contained in the cache line; and fetching a program instruction corresponding to the selected address from the external memory hierarchy to the IFU model.

* * * * *